United States Patent [19]
Kasberg

[11] 3,781,189
[45] Dec. 25, 1973

[54] SPENT NUCLEAR FUEL SHIPPING CASKS
[75] Inventor: Alvin H. Kasberg, Murrysville, Pa.
[73] Assignee: Atlantic Richfield Company, New York, N.Y.
[22] Filed: July 7, 1971
[21] Appl. No.: 160,498

[52] U.S. Cl.................. 176/28, 176/87, 176/27, 252/478, 250/106 R, 250/108 R
[51] Int. Cl........ G21c 19/00, G21f 5/00, G21f 1/08
[58] Field of Search.............. 252/478; 250/108 R, 250/106 R; 176/28, 87, 27

[56] References Cited
UNITED STATES PATENTS
3,039,000  6/1962  Kieffer et al....................... 252/478
2,833,664  5/1958  Knapp............................... 252/478
1,918,996  7/1933  Weger............................... 252/478
3,483,380  12/1969  Antonsen et al.................. 250/106 R
3,575,601  4/1971  Lindsay et al.................... 250/106 R

OTHER PUBLICATIONS

Hodge et al. Neutron–Shield Materials, Nov., 1961, Nucleonics, Pages 158–166

Primary Examiner—Carl D. Quarforth
Assistant Examiner—Roger S. Gaither
Attorney—Michael B. Fein et al.

[57] ABSTRACT $UH_3$-Ductile metal cermet is used as a radiation shield in a shipping cask for spent nuclear fuel rods.

4 Claims, No Drawings 3,781,189

SPENT NUCLEAR FUEL SHIPPING CASKS

BACKGROUND OF THE INVENTION

1. Field of the Invention

This invention relates to a shield material for combined gamma and neutron radiation. More particularly, this invention relates to a material suitable for safe containment of spent nuclear fuel rods. This invention further relates to shipping containers for spent nuclear fuel rods and a method for thier manufacture.

2. Description of the Prior Art

Spent nuclear fuel rods contain fission products which include certain isotopes which emit both gamma and neutron radiation. When these fuel rods are to be shipped from their point of use to a distant reprocessing center, safety requires that they be shipped in a shielded container. Depleted uranium together with water contained inside and employed for its hydrogen values have been suggested as shielding materials. E. Blasch et al., THE USE OF URANIUM AS A SHIELDING MATERIAL, NUCLEAR ENGINEERING AND DESIGN 13 (1970), pages 146-182. Designs such as these necessarily involve very heavy casks and create a transportation problem since, even with specially designed trucks, the shipping casks plus truck are heavier than the capacity of existing roadways. A further problem with this approach is that of containing the water since a water-tight container must be maintained. Furthermore, the water can become contaminated and may be released accidentally. An alternative approach is to add hydrogen-containing material on the outside of the depleted uranium or lead container such as plastic, however, such materials also add significantly to the cask weight.

While uranium hydride has been suggested as a material for combined neutron and gamma shielding, (e.g., Gibb, Jr., HYDRIDE AND METAL-HYDROGEN SYSTEMS, NEPA-1841, U.S. Atomic Energy Technical Information Service, April 30, 1951) no practical way has ever been suggested to apply this theoretical concept. As $UH_3$ has only heretofore been available in powder form which is highly unstable and violently reactive upon exposure to atmosphere or moisture, it has not been seriously considered for this use. No one has conceived of a practical method for utilization of the properties of uranium hydride in an efficient neutron and gamma shield situation. Furthermore, no one has conceived of a method for incorporating uranium hydride in a spent nuclear fuel rod shipping cask.

SUMMARY OF THE INVENTION

It is therefore an object of this invention to provide a method for transporting spent radioactive fuel containing fission products which are a high energy neutron source. It is a further object to provide a method for manufacturing a combined gamma and neutron radiation shield for a shipping cask or the like. A still further object is to provide a shield composition which has greater neutron shielding per unit weight than any previously recognized shield material, most especially, one which may be used for high-gamma shielding pruposes as well. It is a still further object to provide a cask for spent nuclear fuel rods which is comparatively light, has high neutron and gamma shielding properties, and has improved thermal conductivity for removing the heat from the cask contents. These and other objects, as will become apparent from the following description, are achieved by the use of a cermet composition comprising a compacted blend of $UH_3$ powder and powder of a metal selected from the group consisting of copper, aluminum, lead and mixtures thereof.

DETAILED DESCRIPTION OF THE INVENTION

Description of the Preferred Embodiments

The $UH_3$ utilized in this invention contains depleted uranium combined chemically with hydrogen and is a brittle material available in granular or powder form. This material has low thermal conductivity and mechanical properties which make it very impractical for use alone as a shielding material; especially in environments where it would be subject to heat from a radioactive source and to mechanical pressures. The powder utilized in accordance with this invention is preferably less than 200 mesh and most preferably less than 300 mesh.

The ductile metal which serves as a binding agent and also as a thermal conductor in accordance with this invention is preferably aluminum, copper, lead or mixtures such as a copper-lead mixture having from 20 to 95 wt. percent copper. The most preferred metal is copper.

The particle size of the ductile metal powder is preferably less than 200 mesh and most preferably less than 300 mesh, that is to say approximately the same size as the $UH_3$ particles utilized.

In one embodiment of this invention the copper or other metal is precoated with a lubricant such as zinc stearate or molybdenum disulfide before it is blended with uranium hydride powder.

The uranium hydride and ductile metal powders are blended thoroughly under an inert atmosphere, that is, one that is oxygen and moisture free. Suitable atmospheres include inert gases such as argon and neon as well as an atmosphere of nitrogen.

The blend preferably contains a volume percent of $UH_3$ in the range of about 60 to 80 percent by volume. A mechanical compaction is made without heating by any suitable compacting method. The compacting step, of course, takes place under an inert atmosphere. The compacting is done under a pressure of about 30 to 50 tons per square inch, although pressures as low as perhaps 20 tons per square inch should be suitable.

The final $UH_3$ density is most suitably above 7.2 grams per cc, with it preferred to be above 7.6 and most preferred to be about 9.5 grams per cc or higher.

An alternate to the cold press compacting embodiment is one in which the cermet is subsequently sintered.

The resulting cermet has mechanical properties and thermal conductivity which make it suitable for use as a shield in a shipping cask for spent nuclear fuel.

One suitable method for fabricating a shipping cask is to contain the cermet referred to above between two structural metal layers. Suitable structural metals include stainless steel.

The structural containment must be made leak tight and provision made for subsequent leak tests, as is the same as with shields comprising uranium metal above.

The following example is presented to illustrate one embodiment of the invention but is not intended to be limiting.

EXAMPLE

A blend of 80 volume per cent $UH_3$ powder of about 300 mesh and 20 volume per cent copper powder of about 300 mesh by mixing intimately under an inert atmosphere of argon in an isostatic bag and then compacting to a $UH_3$ density of 7.66 grams per cc. It is estimated that a 2½ inch thick brick at this $UH_3$ density combined with 3½ inches of uranium metal has equivalent shielding capacity to 4½ inches of uranium metal combined with 2 inches of hydrogeneous plastic.

The radiation shield materials of the invention are especially suitable for environments where high neutron and gamma shielding per unit weight is required in combination with high heat transfer from the heat producing radioactive material. A shipping cask can be fabricated from this material in much lighter designs for the equivalent neutron and gamma shielding requirement.

Various modifications, alternatives, and improvements should readily become apparent to those skilled in the art without departing from the spirit and scope of the invention.

We claim:

1. A method for transporting spent radioactive fuel comprising encasing said fuel in a cask having a structural metal jacket enclosing a layer of ductile metal cermet comprising a compacted blend of 60 to 80 volume per cent $UH_3$ powder and 20 to 40 volume per cent powder of the group consisting of aluminum, copper, lead, and mixtures thereof.

2. An article for transporting and containing spent fuel rods comprising a cask constructed essentially of the combination of a structural metal jacket enclosing a layer of a $UH_3$-ductile metal cermet shield comprising a compacted blend of 60 to 80 volume per cent $UH_3$ powder and 20 to 40 volume per cent powder of the group consisting of aluminum, copper, lead, and mixtures thereof.

3. The spent fuel rod cask of claim 2 wherein said cask weighs less than 60,000 pounds.

4. A fuel rod shipping cask, the walls of which consist of a leak tight stainless steel jacket enclosing a layer of ductile metal cermet comprising a compacted blend of from about 60 to 80 volume per cent $UH_3$ powder, and the remainder a mixture of copper and lead in a weight ratio of copper to lead from about 95:5 to 80:20, said mixture having been precoated with a lubricant selected from the group consisting of zinc stearate and molybdenum disulfide, said $UH_3$ powder having a density of from about 7.6 to about 9.5 grams per cubic centimeter.

* * * * *